United States Patent
Tseng et al.

(10) Patent No.: US 7,721,031 B2
(45) Date of Patent: May 18, 2010

(54) PCI EXPRESS LINK STATE MANAGEMENT SYSTEM AND METHOD THEREOF

(75) Inventors: Wen-Yu Tseng, Taipei (TW);
Yuan-Zong Cheng, Taipei (TW)

(73) Assignee: VIA Technologies, Inc., Taipei (TW)

(*) Notice: Subject to any disclaimer, the term of this patent is extended or adjusted under 35 U.S.C. 154(b) by 481 days.

(21) Appl. No.: 11/432,356

(22) Filed: May 12, 2006

(65) Prior Publication Data

US 2006/0271651 A1 Nov. 30, 2006

Related U.S. Application Data

(60) Provisional application No. 60/683,313, filed on May 23, 2005.

(30) Foreign Application Priority Data

Nov. 2, 2005 (TW) ................ 94138424 A

(51) Int. Cl.
*G06F 13/42* (2006.01)
*G06F 1/32* (2006.01)
*G06F 11/00* (2006.01)

(52) U.S. Cl. ................ 710/105; 710/106; 713/320; 713/324; 714/2; 714/56

(58) Field of Classification Search ............ 710/104, 710/105, 316, 11, 14, 106; 713/310, 320, 713/323–324, 330; 714/2, 55, 56
See application file for complete search history.

(56) References Cited

U.S. PATENT DOCUMENTS

| | | | | |
|---|---|---|---|---|
| 4,763,296 | A | * | 8/1988 | Gercekci .................. 714/55 |
| 4,872,110 | A | * | 10/1989 | Smith et al. ............... 714/55 |
| 6,122,690 | A | * | 9/2000 | Nannetti et al. ........... 710/311 |
| 7,188,263 | B1 | | 3/2007 | Rubinstein et al. |
| 7,287,096 | B2 | | 10/2007 | Wunsch |
| 7,320,080 | B2 | | 1/2008 | Solomon et al. |
| 7,383,457 | B1 | | 6/2008 | Knight |
| 2003/0123486 | A1 | | 7/2003 | Lacey, III |
| 2004/0128576 | A1 | * | 7/2004 | Gutman et al. ........... 713/323 |
| 2004/0268169 | A1 | | 12/2004 | Bashford et al. |
| 2005/0086549 | A1 | * | 4/2005 | Solomon et al. .......... 713/320 |
| 2005/0097378 | A1 | | 5/2005 | Hwang |

OTHER PUBLICATIONS

"PCI Express Base Specification". Revision 1.0a. PCI-SIG. Apr. 15, 2002. pp. 1-118.*
"PCI Express Base Specification". Revision 1.0a. PCI-SIG. Apr. 15, 2002. pp. 119-220.*
"PCI Express Base Specification". Revision 1.0a. PCI-SIG. Apr. 15, 2002. pp. 221-310.*
"PCI Express Base Specification". Revision 1.0a. PCI-SIG. Apr. 15, 2002. pp. 311-428.*

* cited by examiner

*Primary Examiner*—Thomas J Cleary
(74) *Attorney, Agent, or Firm*—Bacon & Thomas, PLLC

(57) ABSTRACT

A PCI Express link state management system and method thereof is disclosed. The PCI Express link state management system includes an upstream device, a downstream device and a link. The upstream device outputs a configuration request to the downstream device to change a device power state of the downstream device. At the time, the link is in a first link state. The downstream device outputs a power entering signal to the upstream device and counts a time period. The link enters to a recovery state and further then return to the first link state if the downstream device does not receive a power request acknowledging signal before the time period is expired.

24 Claims, 2 Drawing Sheets

PCI EXPRESS LINK STATE MANAGEMENT SYSTEM AND METHOD THEREOF

This application claims the benefit of U.S. provisional application Ser. No. 60/683,313, filed May 23, 2005, and Taiwan application Serial No. 94138424, filed Nov. 2, 2005, the subject matter of which are incorporated herein by reference.

BACKGROUND OF THE INVENTION

1. Field of the Invention

The invention relates in general to a power state management system and method thereof, and more particularly to a PCI Express link state (L-state) management system and method thereof.

2. Description of the Related Art

Along with technology progress, the mainstream peripheral component interconnect (PCI) of personal computers has becoming too narrow in transmission bandwidth to meet the requirement of processors and output/input devices in the future. Therefore, industrials supply a new generation of PCI Express as a standard field input/output bus for various operation platforms in the future. The main feature of PCI Express lies in the increase of performance where the single transmission rate can reach 2.5 GHz. The transmission rate can be further improved by increasing the number of lanes, such as using 4 lanes to reach 4 times of transmission rate.

The advanced configuration and power interface (ACPI) defines the power states in various situations, which are called device power states or D-states, and PCI Express further defines the power states of the links among devices, which are called link states or L-states. Besides, the link states have also corresponding relationship with the device power states.

The device power state Do represents the device operates in a normal state. When the devices are set in the D0 state, the link among the devices is set in a link state L0, L0s or L1.

The device power states D1 and D2 are not defined clearly. Generally speaking, these two states save less electric power but maintain more device states. The D1 and D2 states correspond to the link power state L1.

The device power state D3 implies a power off state, which includes D3cold and D3hot states. When a device is in the D3cold state, it implies the main power is not supplied to the device. When the device is in the D3hot state, it implies the main power is still supplied to the device. When the power state of devices is D3cold, if some auxiliary power is supplied to the devices, the link among the devices corresponds to a link state L3. The device power state D3hot corresponds to the link state L1 or L2/L3 ready.

The link state L0 defines the link among devices is in normal operation. During the data transmission of the link among devices, if there exists temporary idle periods, the system can enter the link state L0s to reduce power consumption.

When the link among devices is set in the link state L1, the devices have no operation requirement, and thus the required electrical power for the link among the device can be reduced. In the meanwhile, no clock signal is triggered and the phase locked loop (PLL) is also paused.

The link states L2 and L3 are both power-off states. The link state L2 has auxiliary power but the link state L3 has none.

SUMMARY OF THE INVENTION

The invention provides a PCI Express link state management system and method thereof. When the link of devices enters to L1 state, more electrical power can be saved and the system break-down issue can be avoided.

The invention provides a method for managing a PCI Express link state applied to a link connected between an upstream device and a downstream device. The method includes outputting a configuration request to the downstream device to change a device power state of the downstream device, wherein the link is in a first link state. Then, outputting a power entering signal to the upstream device and counting a time period. If the downstream device does not receive a power request acknowledging signal when the time period is expired, transiting the link to a recovery state.

The invention provides a system for managing a link state includes an upstream device, a downstream device and a link. The link is connected between the upstream device and the downstream device for data transmission under normal operation. The upstream device outputs a configuration request to the downstream device to change a device power state. The down stream device outputs a power entering signal to the upstream device to response the configuration request. If the downstream device does not receive a power request acknowledging signal when a time period is expired, the link enters to a recovery state.

Other objects, features, and advantages of the invention will become apparent from the following detailed description of the preferred but non-limiting embodiments. The following description is made with reference to the accompanying drawings.

DETAILED DESCRIPTION OF THE INVENTION

In the PCI Express specification, the active state power management (ASPM) of hardware mechanism is used to process the transition from the L0s state to the L1 state.

Besides, the PCI Express also has software controlled programmed power management (PPM). However, when the link between an upstream device and a downstream device should be transited from the L0 state to the L1 state by software, the upstream device asserts commands for transiting the downstream device to a non-Do power state, which easily causes the system to break down due to poor signal transmission.

Figure 1:
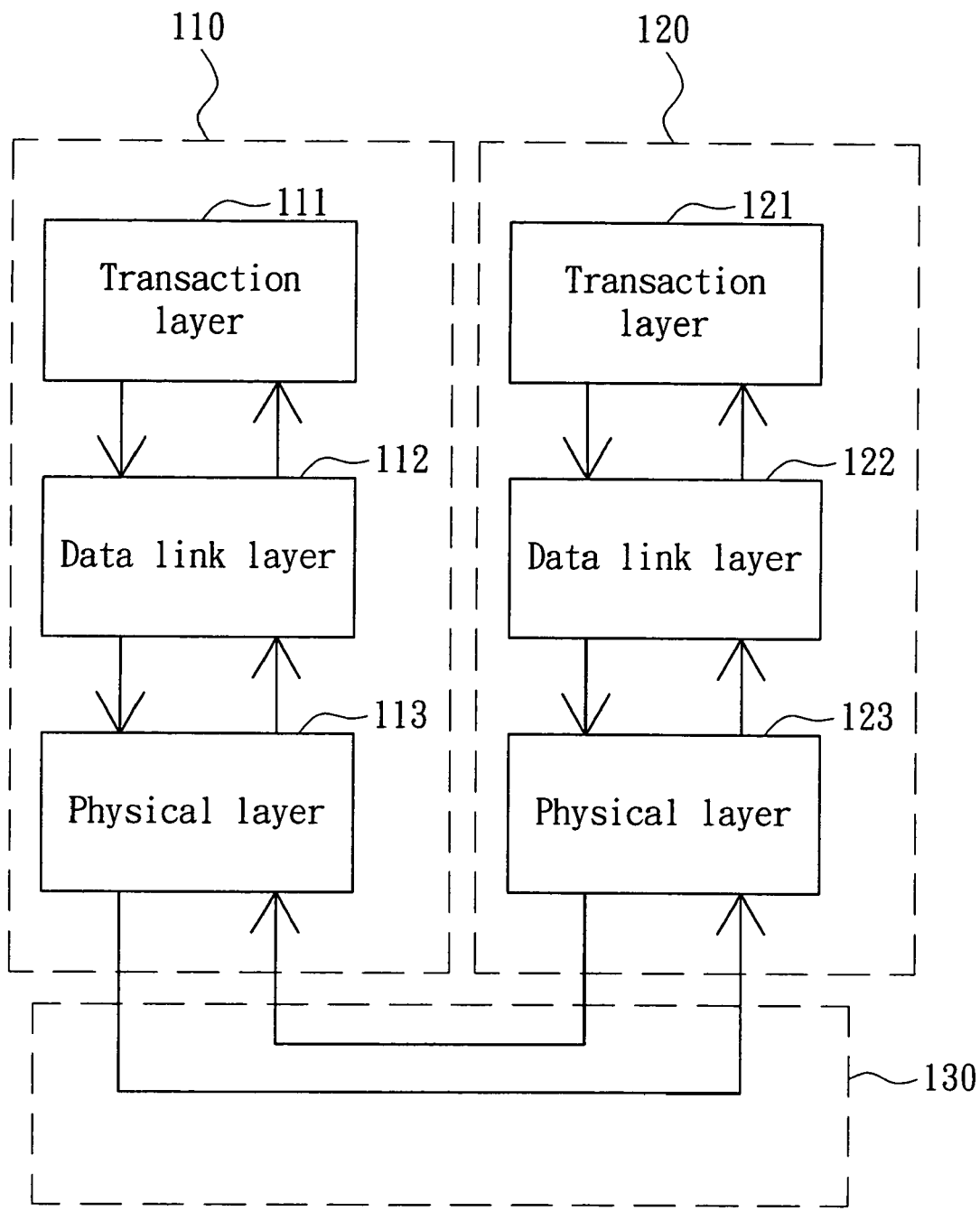
FIG. 1 is a block diagram of a PCI Express link state data transmission system according to the invention.

Referring to FIG. 1, a block diagram of a PCI Express data transmission system according to the invention is shown. The PCI Express data transmission system includes an upstream device 110, a downstream device 120 and a link 130. The link 130 is electrically connected between the upstream device 110 and the downstream device 120.

The upstream device 110 includes a transaction layer (TL) 111, a data link layer (DLL) 112 and a physical layer (PHY) 113. The transaction layer 111 generates and transmits data packets to the data link layer 112, or, receives data packets from the data link layer 112. The transaction layer 111 also manages the flow control among the transaction layer 111 and devices. The data packets received or generated by the transaction layer 111 are regarded as transaction layer packets (TLPs).

The data packets transmitted between the data link layer 112 and the physical layer 113 regarded as data link layer packets (DLLPs). The data link layer 112 receives the data packet and then provides the transaction layer packet to the transaction layer 111. Or the data link layer 112 receives the transaction layer packet outputted from the transaction layer 111 and then outputs the data packet to the physical layer 113. The data link layer 112 can further error detecting for stably transmitting packets as performing the above-mentioned operation.

The physical layer 113 takes charge of transmitting packets via the link 130 between the upstream device 110 and the downstream device 120. The physical layer 113 receives packets from the downstream device 120 and then outputs data link layer packets (DLLPs) to the data link layer 112 via the link 130.

The downstream device 120, similar to the upstream device 110, includes a transaction layer 121, a data link layer 122 and a physical layer 123. The operation of each layer is similar to those of the upstream device 110, and thus any detail is not necessarily given here.

Figure 2:
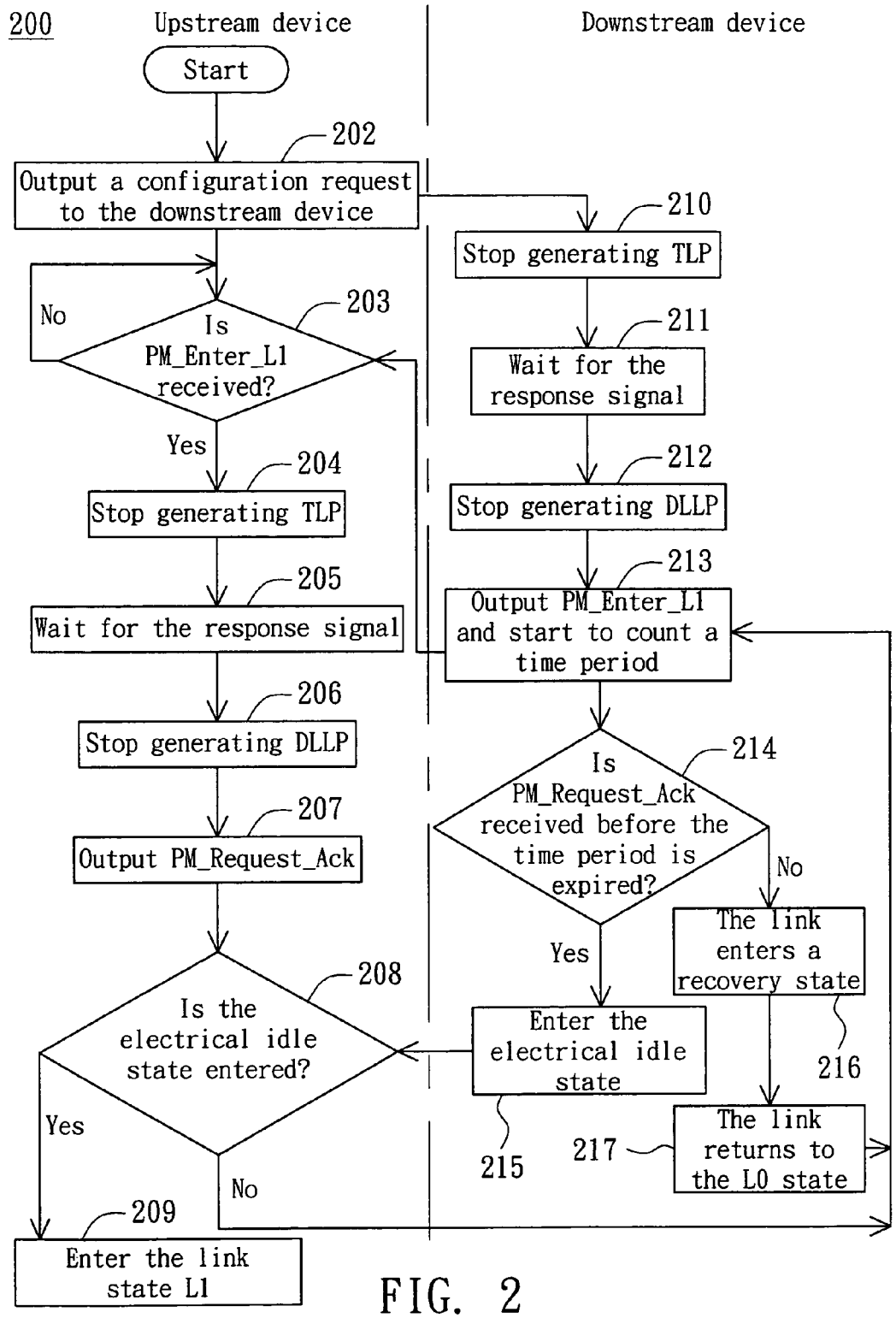
FIG. 2 is a flow chart of a PCI Express link state management method according to the invention.

Referring to FIG. 2, a flow chart 200 of a PCI Express link state management method according to the invention is shown.

In step 202, the power management of the upstream device 110 outputs a configuration request to the downstream device 120 to change the device power state, such as D1, D2 or D3hot, of the downstream device 120. At the time, the link 130 between the upstream device 110 and the downstream device 120 is assumed in a first link state which is a normal operation state such as the link power state L0 In the present invention, assume the configuration request is a transaction layer packet; and the upstream device 110 is a root complex and downstream device 120 is an endpoint, such as a display card.

In step 210, the downstream device 120 stops generating the transaction layer packets (TLPs) in response to the configuration request. Next, in step 211, the downstream device 120 waits for receiving a response signal generated by the upstream device 110 in response to the previous transaction layer packet. In step 212, the downstream device 120 stops generating data link layer packets (DLLPs) except for a power entering signal PM_Enter_L1. In step 213, the downstream device 120 outputs the power entering signal, PM_Enter_L1, to the upstream device 110, and starts to count a time period. Then in step 214, the downstream device 120 detects if a power request acknowledging signal, PM_Request_Ack, is received before the time period is expired, wherein the power request acknowledging signal, PM_Request_Ack, is asserted by the upstream device 110 to notify the reception of the power entering signal PM_Enter_L1.

In step 203, the upstream device 110 determines whether the power entering signal, PM_Enter_L1, is received. In step 204, the upstream device 110 stops generating transaction layer packets (TLPs) after receiving the power entering signal, PM_Enter_L1. Then, in step 205, the upstream device 110 waits for receiving the response signal of the previous transaction layer packet. In step 206, the upstream device 110 stops generating data link layer packets (DLLPs) except for the power request acknowledging signal, PM_Request_Ack.

In step 207, the upstream device outputs the power request acknowledging, signal PM_Request_Ack, to the downstream device 120. If the downstream device 120 receives the power request acknowledging signal, PM_Request_Ack, when the time period is expired, the link 130 enters to an electrical idle state as shown in step 215.

In step 209, if the link 130 has entered to the electrical idle state, the link 130 further enters to a second link state (ex. L1 state). Therefore, after the link state changed, the downstream device 120 enters to D1, D2 or D3hot state (not shown in the figure).

Conversely, if the downstream device 120 does not receive the power request acknowledging signal, PM_Request_Ack, when the time period is expired, the link 130 enters a recovery state (in step 216). Next, in step 217, the link 130 returns to the first link state, such as the L0 state. Then, the downstream device 120 re-outputs the power entering signal, PM_Enter_L1, to the upstream device 110 and the time period is restarted (back to step 213). The operation that the link 130 transited from the link state L1 to the recovery state is regarded as trigger retrain.

As mentioned above, it can be known that in the invention, the downstream device 120 will continuously output the power entering signal, PM_Enter_L1, to the upstream device 110 until the downstream device 120 receives the power request acknowledging signal, PM_Request_Ack. Moreover, if the downstream device 120 has exactly received the power request acknowledging signal, PM_Request_Ack, from the upstream device 110, the link 130 enters to the electrical idle state. If the downstream device 120 does not received the power request acknowledging signal, PM_Request_Ack, the link 130 is firstly enters to the recovery state and then return to the first link state, such as the L0 state.

In the invention, a time period is considered. When the power entering signal, PM_Enter_L1, is asserted, the time period counts. When the time period is expired, if the downstream device 120 doesn't receive the power request acknowledging signal, PM_Request_Ack, thus the link 130 enters to the recovery state first and then returns to the first link state. Therefore, the system is prevented from being broken down due to all-the-time wait for the power request acknowledging signal PM_Request_Ack.

It can be recognized from the above description that the invention can prevent the over-wait situation of the system occurred when the upstream device 110 does not receive the power entering signal PM_Enter_L1 or the downstream device 120 does not receive the power request acknowledging signal PM_Request_Ack.

In step 213, the time period is programmable. In the invention, the time period can be 32 cycles, 64 cycles or a period of time waiting for the power request acknowledging signal.

In the PCI Express link state management system and method thereof disclosed by the above-mentioned embodiment of the invention, when the link state is changed, the link of devices exactly enters next link state in a counting way, thereby not only reducing power consumption but also preventing system break-down in the power state conversion occurred in prior art.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for managing a PCI Express link state, applied to a link connected between a upstream device and a downstream device, the method comprising:
   outputting a configuration request to the downstream device to change a device power state of the downstream device, wherein the link is in a first link state;
   outputting a power entering signal to the upstream device and counting a time period; and transiting the link to a recovery state, returning the link to the first link state and then repeating the step of outputting a power entering signal to the upstream device and counting a time period if the downstream device does not receive a power request acknowledging signal before the time period is expired.

2. The method according to claim 1, before the step of outputting a power entering signal to the upstream device, the method further comprising:
stopping generating transaction layer packets (TLPs) from the downstream device in response to the configuration request;
waiting for a response signal of a previous transaction layer packet generated from the upstream device; and
stopping generating data link layer packets (DLLPs) from the downstream device.

3. The method according to claim 1, the upstream device further comprising:
stopping generating transaction layer packets after receiving the power entering signal;
waiting for a response signal of a previous transaction layer packet generated from the downstream device; and
stopping generating data link layer packets.

4. The method according to claim 3, further comprising outputting the power request acknowledging signal to the downstream device in response to the power entering signal.

5. The method according to claim 1, further comprising transiting the link to an electrical idle state if receiving the power request acknowledging signal before the time period is expired.

6. The method according to claim 5, further comprising stopping the data transmission and transiting the link to a second link state when the link is in the electrical idle state.

7. The method according to claim 6, wherein the second link state is an L1 state.

8. The method according to claim 1, wherein the configuration request is a transaction layer packet, the power entering signal is a data link layer packet, and the power request acknowledging signal is a data link layer packet.

9. The method according to claim 1, wherein the first link state is a link power state L0.

10. The method according to claim 1, wherein the time period is 32 cycles, 64 cycles or a period of waiting for the power request acknowledging signal.

11. The method according to claim 1, further comprising determining if the link enters an electrical idle state when the downstream device receives the power request acknowledging signal before the time period is expired, and repeating the step of outputting a power entering signal to the upstream device if the link does not enter the electrical idle state.

12. A system for managing a link state, comprising:
an upstream device;
a downstream device; and
a link connected between the upstream device and the downstream device for data transmission;
wherein the upstream device outputs a configuration request to the downstream device to change a device power state of the downstream device, and the downstream device outputs a power entering signal to the upstream device to response the configuration request, and
wherein the link is in a first link state for normal data transmission;
wherein if the downstream device does not receive a power request acknowledging signal before a time period is expired, then the link enters to a recovery state and then returns to the first link state and the downstream device re-outputs the power entering signal to the upstream device after the link returns to the first link state, and recounts the time period.

13. The system according to claim 12, wherein each of the upstream device and the downstream device comprises a transaction layer, a data link layer and a physical layer.

14. The system according to claim 13, wherein the configuration request is a transaction layer packet, the power entering signal is a data link layer packet, and the power request acknowledging signal is a data link layer packet.

15. The system according to claim 13, wherein when the downstream device receives the configuration request, the transaction layer and the data link layer of the downstream device stop generating the transaction layer packets and the data link layer packets.

16. The system according to claim 13, wherein when the upstream device receives the power entering signal, the transaction layer and the data link layer of the upstream device stop generating the transaction layer packets and the data link layer packets.

17. The system according to claim 13, wherein the upstream device outputs the power request acknowledging signal in response to the power entering signal.

18. The system according to claim 13, the system is a PCI Express link system.

19. The system according to claim 12, wherein the first link state is an L0 state.

20. The system according to claim 12, wherein if the downstream device receives the power request acknowledging signal before the time period expires, the link enters to an electrical idle state and stops the data transmission, and then the link further enters to a second link power state.

21. The system according to claim 20, wherein the second link power state is an L1 state.

22. The system according to claim 12, wherein the time period is 32 cycles, 64 cycles or a period of waiting for the power request acknowledging signal.

23. The system according to claim 12, wherein the upstream device is a root complex, and the downstream device is an endpoint.

24. The system according to claim 12, wherein when the downstream device receives the power request acknowledging signal before the time period is expired, and the link does not enter an electrical idle state, the downstream device re-outputs the power entering signal to the upstream device and re-counts the time period.

* * * * *